United States Patent [19]

Jones et al.

[11] Patent Number: 4,564,736
[45] Date of Patent: Jan. 14, 1986

[54] INDUSTRIAL HAND HELD LASER TOOL AND LASER SYSTEM

[75] Inventors: Marshall G. Jones, Scotia, N.Y.; Donald C. Richardson, Lynn, Mass.

[73] Assignee: General Electric Company, Schenectady, N.Y.

[21] Appl. No.: 608,042

[22] Filed: May 7, 1984

[51] Int. Cl.⁴ .............................................. B23K 26/00
[52] U.S. Cl. ........................... 219/121 L; 219/121 LC; 219/121 LH; 350/96.29
[58] Field of Search ..... 219/121 L, 121 LM, 121 LC, 219/121 LD, 121 LU, 121 LV, 121 LP, 121 FS, 121 LH, 121 LJ; 350/96.10, 96.20, 96.21, 96.22, 96.29, 96.30, 96.33; 250/227; 357/17, 18, 19, 30, 74, 75

[56] References Cited

U.S. PATENT DOCUMENTS

| 3,382,343 | 5/1968 | Muncheryan | 219/121 LC |
| 3,696,230 | 10/1972 | Friedrich | 219/121 FS X |
| 3,821,510 | 6/1974 | Muncheryan | 219/121 LV |
| 3,843,865 | 10/1974 | Nath | 219/121 L |
| 3,920,980 | 11/1975 | Nath | 219/121 LV X |
| 3,995,934 | 12/1976 | Nath | 350/96.26 X |

OTHER PUBLICATIONS

G. Nath, "Hand-Held Laser Welding of Metals Using Fiber Optics", Optics and Laser Technology, vol. 6, No. 5, pp. 233-235, Oct. 1974.

*Primary Examiner*—C. L. Albritton
*Assistant Examiner*—Alfred S. Keve
*Attorney, Agent, or Firm*—Donald R. Campbell; James C. Davis, Jr.; Paul R. Webb, II

[57] ABSTRACT

Laser processes such as cutting, drilling, and welding metals and other materials are performed manually with a hand held fiber optic laser tool. A near infrared or visible wavelength pulsed laser beam is coupled to the tool by a single clad quartz fiber whose ends are prepared to reduce losses and which transmits laser energy with peak powers in the kilowatt range to the output end. The hand held laser tool is comprised of focusing optics for the laser beam, an inert gas supply for welding cover gas, and an oxygen supply for gas assist cutting.

8 Claims, 4 Drawing Figures

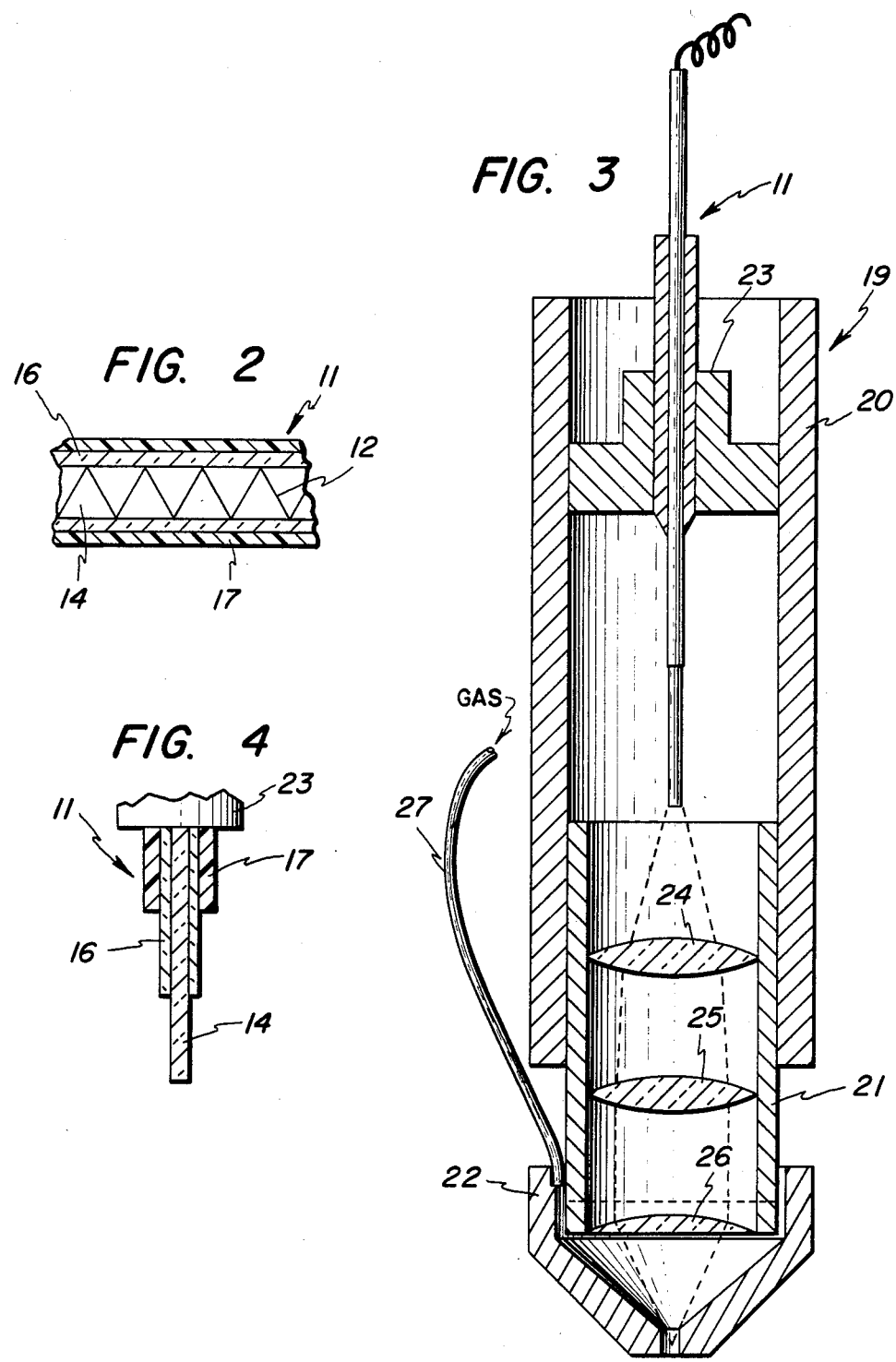

INDUSTRIAL HAND HELD LASER TOOL AND LASER SYSTEM

BACKGROUND OF THE INVENTION

This invention relates to apparatus for material and metal processing, and more particularly to a hand held laser cutting, drilling and welding tool and to a manual laser process system.

In laser material processing for such areas as development, repair and overhaul, manual capability is not presently available and is needed where computer control would not be cost effective. The technologies that have been used in the past to address the problems in development, repair and overhaul have been tungsten inert gas (TIG) welding, arc welding, electron beam (EB) welding, torch and vacuum brazing, and electro discharged machining. There are repair welds on equipment that are not always accessible to the conventional processes mentioned above. There are conditions where material must be removed from plug holes that are not always accessible by mechanical or EDM techniques. Also, if accessible by EDM, the process is very slow and cannot be done by hand. The same accessibility concerns would exist with other processes.

It has been shown that a neodymium:YAG laser used in pulsed mode is coupled to and passed through a single quartz fiber optic cable at peak power levels required for laser material processing. This flexible fiber permits laser cutting, drilling, and welding of metals with a robot. Refer to commonly assigned copending application Ser. No. 450,951, filed Dec. 20, 1982, M.G. Jones and G. Georgalas, "Laser Material Processing Through a Fiber Optic", now abandoned, and continuation application Ser. No 714,660, filed Mar. 21, 1985. Hand held laser fiber optic medical and surgical instruments have been developed, but the power levels are low. The neodymium-YAG laser, a source of 1.06 micrometer wavelength energy, has provided 100 watt continuous wave average power for surgical applications. Peak powers in excess of 1000 watts is more suitable for metal processing.

SUMMARY OF THE INVENTION

An object of the invention is to give the operator the ability to manually perform a variety of manufacturing laser processes such as cutting, drilling, welding, localized heat treating, brazing, and marking.

Another object is to enable an operator to perform metal working tasks with a laser through the use of a hand held tool.

The manual laser material processing system includes a laser which produces a near infrared or visible wavelength laser beam, a single fiber optic, preferably with a clad quartz core, which serves as a lightguide, and an input coupler to shape the laser beam to enter the fiber optic without damage to the latter. Laser energy with peak powers in the kilowatt range is passed through the fiber to the output end. The hand held laser tool is comprised of means for holding the output end of the fiber optic, means for focusing the emerging beam to a small spot at a power density high enough for industrial metal and material processing, and means for delivering process assist gas.

Both ends of the single fiber are prepared to reduce Fresnel losses by removal of the cladding and protective shielding for a short distance at either end and removal of only the shielding for an equal distance. An inert gas supply for welding cover gas or an oxygen supply for gas assist cutting is provided to the gas nozzle which is supported on the main housing of the tool. The housing is cool enough to be grasped by the human hand with the laser system operating.

BRIEF DESCRIPTION OF THE DRAWINGS

FIG. 2 is a longitudinal cross section through the fiber optic cable showing passage of the laser beam.

FIG. 3 is a vertical cross section through the hand held industrial laser tool.

FIG. 4 shows to an enlarged scale the preparation of the exit end of the fiber optic in the tool.

DETAILED DESCRIPTION OF THE INVENTION

Figure 1:
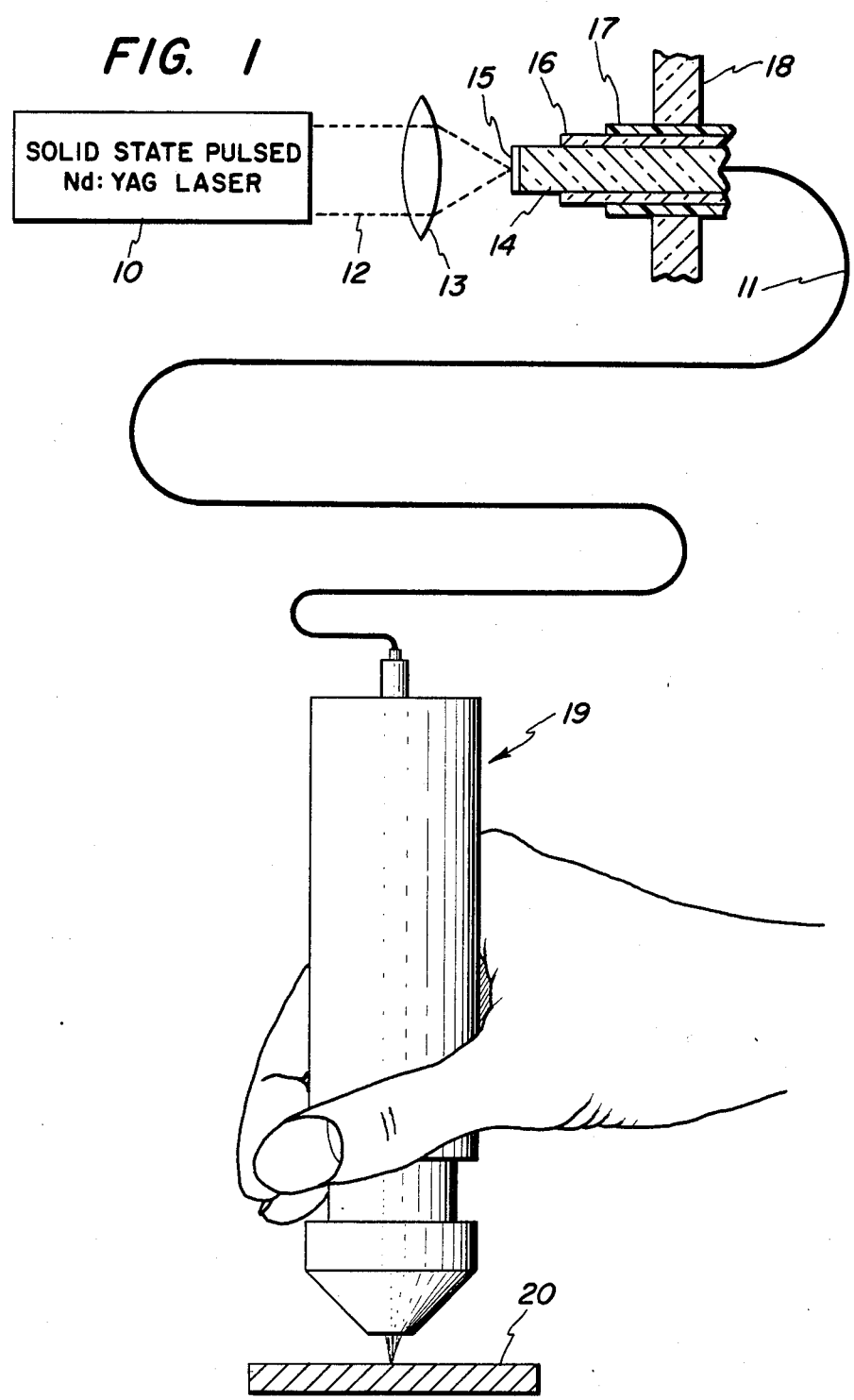
FIG. 1 is a schematic of a laser material processing system and a hand held fiber optic laser tool used for metal working.

The system shown in FIG. 1 performs laser cutting, drilling, and welding with a hand held fiber optic laser tool. A solid state neodymium-yttrium aluminum garnet (YAG) laser, or any laser which is operated in a pulsed mode or continuous wave mode and has a wavelength in the near infrared or visible spectrum, is coupled to the hand held tool with a single fiber optic. Other suitable solid state lasers are: Nd:glass; Nd:GGG (gadolinium gallium garnet); Nd:GSGG (gadolinium scandium gallium garnet); the ruby laser; the alexandrite laser; Cr:GGG; and Cr:GSGG. The Nd:YAG and Nd:glass lasers have a wavelength of 1.06 micrometers, in the near infrared, and the ruby laser has a wavelength of 680 nanometers, in the visible spectrum; these are preferred at present.

Quartz is the preferable core material for the fiber optic. The fundamental loss for most fibers is caused by absorption of impurities in the core material, and by scattering due to inhomogeneities and inclusions in the core. Ultra pure fused silica-glass has the lowest attenuation of any material tested for near infrared and visible light. Attenuation in an optical fiber is typically expressed in decibels, and is usually normalized to a one-kilometer reference length. Fibers tested ranged in losses from 6.5 to 16.2 dB/km. The fiber optic cable 11 consists of a quartz core that is clad with silicone or glass, and has a nylon shielding or jacket for mechanical protection. If a fused quartz fiber optic is glass cladded, the flexibility of the fiber would be decreased as compared to a silicone cladded fiber. The latter fiber, with a one millimeter core diameter, has a typical 20 centimeter (8 inch) minimum bend radius without any loss of energy through the cladding.

The Nd:YAG laser 10 being used in a pulsed mode is coupled to the one millimeter diameter fused quartz fiber optic 11 by focusing the laser beam 12 down on the end of the fiber with a lens 13. The laser beam is focused to a small spot whose diameter is less than the diameter of quartz core 14, while the included angle of the focused beam must be less than the numerical aperture (NA) of the fiber. Numerical aperture is the sine of the half-angle over which an optical fiber can accept light rays, multiplied by the index of refraction of the medium containing the rays (which is 1 for air). The functional requirement for the input coupler is to shape the laser beam so that it can enter a single fiber optic cable with no damage to the latter. Summarizing, in order for the laser energy to enter the fiber, two conditions are required. First, the diameter of the laser beam spot at the focal plane of the input coupler is required to be less than the diameter of the quartz core 14 of the fiber. Second, the numerical aperture of the fiber optic is such that the included angle of the focused beam is smaller than 20–25°. The variation in the NA is dependent on the different type fibers. For best results, the end of core 14 would be polished and have an antireflection coating 15.

The end of fiber optic 11 is prepared to reduce Fresnel losses. The fiber end is stripped of silicone cladding 16 and shielding 17 for 0.75 inches, and in the next section just the shielding is removed for an equal distance. This prepared end is then placed in a Pyrex® holder 18 and set at the proper focal plane of the laser. The prepared end allows beam coupling through two zones, core-air and core-cladding. The first region permits the highly divergent incident beam to enter the fiber 11 through a greater acceptance angle provided by the core-air interface. The second zone provides additional reflections to insure transmission of the collected light energy. The third zone of core, cladding and shielding provides a rugged housing for fiber handling. Referring to FIG. 2, upon entering one end of the fiber, the laser beam 12 travels along the quartz core 14 in a zig-zag path by total internal reflection at the interface with the cladding 16. In general, the fiber functions as a waveguide for optical transmission of light. Laser energy with peak powers in the kilowatt range is passed through the fiber to the output end. In excess of 400 watts average power and peak power up to 13,000 watts has been transmitted into the quartz fiber optic.

The hand held laser tool 19 at the output end of the fiber optic cable (see FIG. 3) has focusing optics for the laser beam and an inert gas supply for welding gas cover or an oxygen supply for gas assist cutting. The emerging laser beam is focused onto the workpiece 20 at power densities high enough for manufacturing processes such as cutting, drilling and welding, and localized heat treating, brazing, and marking are other processes that may be performed. The power density is sufficient to melt and vaporize metals and other materials. Hand held fiber optic laser tool 19 is comprised of a cylindrical main housing 20 and lens housing 21, and a gas nozzle 22, all made of a metal such as aluminum. The fiber optic cable 11 passes through a central bore in a support column 23 and secured by set screws. There is a threaded connection between holder 23 and the inside of main housing 20 so it can be screwed down in and the position of the fiber end adjusted. The output end of the fiber optic cable is prepared in exactly the same manner as the input end to reduce Fresnel losses. As seen in FIG. 4, the bare end of fiber 11 is followed by a section with only the cladding 16, both 0.75 inches in length, and the remainder has both the cladding and shielding 16 and 17. The output is through the two zones, core-cladding and core-air.

Lens housing 21 is screwed into the end of main housing 20 to adjust the focus relative to the end of the fiber. The key function of the output coupler is to collect and condense all the laser energy that is transmitted through the fiber optic cable 11. The output optical system includes collimating and objective lenses 24–26. The divergent beam emerging from the fiber optic is collimated and focussed to a small spot at a sufficient power density to perform laser material processing tasks, for instance $10^6$–$10^7$ watts/cm$^2$ for drilling and cutting.

A supply line 27 on the hand held laser tool 19 delivers process assist gas to the gas nozzle 22, which is attached to the free end of lens holder 21. A separate gas hose is provided, or the tool may have an integral gas channel. The assist gas, typically argon, helium, a mixture of these, or oxygen, is introduced for lens protection as well as material processing enhancement.

It is contemplated that the hand held tool will have a diameter of under 1 inch, although experimental models at present are larger than this. The main housing 20 of the manual laser tool 19 is cool enough to be held by the human hand with the laser system in operation, without wearing gloves. Initial experiments have shown that the following hand held fiber optic laser tool applications are feasible:

1. Welding with the addition of filler material
2. Autogenous edge and butt welding of Inconels, Hastelloys, high nickel base alloys, and cobalt base alloy
3. Melting of Rene 80 powder
4. Unplug holes that were filled with braze alloy
5. Welding of material inside of chamber by passing the hand held laser beam through glass chamber wall from the outside
6. Marking of particular materials While the invention has been particularly shown and described with reference to a preferred embodiment thereof, it will be understood by those skilled in the art that various changes in form and details may be made therein without departing from the spirit and scope of the invention.

What is claimed is:

1. A laser system for manual material processing comprising:
   a laser which produces a near infrared or visible wavelength beam;
   a single fiber optic serving as a lightguide;
   an input coupler to shape said laser beam to enter said fiber optic which transmits laser energy to the output end with peak powers in the kilowatt range; and
   a hand held laser tool comprised of means for holding the output end of said fiber optic, means for focusing the emerging beam to a small spot at a high enough power density to do industrial laser material processing, and means for delivering process assist gas;
   said fiber optic having a core, a cladding and protective shielding, and both ends of said fiber are prepared to reduce Fresnel losses by removal of said cladding and shielding for a short distance and removal of only said cladding for an equal distance.

2. The system of claim 1 wherein said laser tool has a cylindrical main housing, cool enough to be held by the human hand with said laser system in operation, which supports a lens housing and gas nozzle.

3. A manual laser material processing system comprising:
   a source of a near infrared or visible wavelength laser beam;
   a single fiber optic which has a quartz core and passes laser energy to the output end with peak powers in the kilowatt range;
   means for focusing said laser beam to a small spot on the input end of said quartz core whose diameter is less than the core diameter, the included angle of said focused beam being less than the numerical aperture of said fiber optic; and a hand held laser tool having a housing that supports a gas nozzle and is comprised of means for holding the output end of said fiber optic, an optical system to collimate and focus the diverging beam exiting from said fiber optic to a small spot at a power density high enough for laser processes including the cutting, drilling and welding of metals, and means for delivering process assist gas to said gas nozzle;

said fiber optic having a cladding and protective shielding on said core, and both ends of said fiber are prepared to reduce losses by removal of said cladding and shielding, and then removal of only said shielding to establish core-air and core-cladding zones for beam coupling.

4. The system of claim 3 wherein said assist gas is oxygen.

5. The system of claim 3 wherein said assist gas in an inert cover gas.

6. An industrial laser material processing system comprising:

a source of a near infrared or visible wavelength pulsed laser beam;

means for coupling said laser beam to a single fiber optic which transmits to the output end laser energy with peak powers in the kilowatt range; and a manual laser tool for performing metal and material processing tasks comprised of a hand held housing which supports a has nozzle, means for supporting the output end of said fiber optic inside said housing, an optical system in said housing for collimating and focusing the divergent beam emerging from said fiber optic to a small spot at a power density to melt and vaporize metals and other materials, and a supply line to deliver process assist gas to said gas nozzle;

said fiber optic having a quartz core, a cladding and a shielding, and the output end is prepared to reduce losses by having only said shielding removed in one section and both said shielding and cladding removed in the next section at the end.

7. The system of claim 6 wherein said assist gas is oxygen.

8. The system of claim 6 wherein said assist gas is an inert cover gas.

* * * * *